United States Patent [19]
Yeh et al.

[11] Patent Number: 6,105,968
[45] Date of Patent: Aug. 22, 2000

[54] TEXTURED SEAL FOR REDUCED WEAR

[75] Inventors: Oscar C. Yeh, Berkeley, Calif.;
Douglas P. Hart, Charlestown, Mass.;
Mary C. Boyce, Winchester, Mass.;
Hugo A. Ayala, Cambridge, Mass.

[73] Assignee: Massachusetts Institute of Technology, Cambridge, Mass.

[21] Appl. No.: 08/806,266

[22] Filed: Feb. 24, 1997

[51] Int. Cl.[7] .................................................. F16J 15/34
[52] U.S. Cl. ............................................ 277/399; 277/306
[58] Field of Search .................................... 277/306, 307, 277/345, 399, 400, 402, 407, 465, 559, 574, 592, 593, 594, 639, 549, 530; 305/100, 101, 102, 103, 104, 105

[56] References Cited

U.S. PATENT DOCUMENTS

| | | | |
|---|---|---|---|
| 1,876,520 | 9/1932 | Newkirk et al. | 277/369 |
| 2,006,602 | 7/1935 | Muster | 277/530 |
| 2,009,281 | 7/1935 | Stein | 277/384 |
| 2,233,902 | 3/1941 | Schmied | 277/543 |
| 2,489,715 | 11/1949 | Mark, Jr. et al. | 277/436 |
| 3,312,376 | 4/1967 | Rooney | 222/320 |
| 3,497,225 | 2/1970 | Workman | 277/559 |
| 3,523,682 | 8/1970 | Jensen | 432/86 |
| 3,572,730 | 3/1971 | Otto et al. | 277/400 |
| 3,616,125 | 10/1971 | Bowling | 277/345 X |
| 3,704,019 | 11/1972 | McHugh | 277/400 |
| 3,744,805 | 7/1973 | Heinrich . | |
| 3,973,781 | 8/1976 | Grorich | 277/559 |
| 4,084,826 | 4/1978 | Vossieck et al. | 277/559 |
| 4,288,083 | 9/1981 | Braconier . | |
| 4,447,064 | 5/1984 | Ehrmann et al. | 277/559 |
| 4,491,331 | 1/1985 | Salant et al. | 277/379 |
| 4,560,174 | 12/1985 | Bisi | 277/382 |
| 4,610,319 | 9/1986 | Kalsi . | |
| 4,619,534 | 10/1986 | Daly et al. . | |
| 4,856,794 | 8/1989 | Boyers et al. | 277/574 X |
| 4,973,068 | 11/1990 | Lebeck | 277/399 |
| 5,069,509 | 12/1991 | Johnson et al. | 305/118 |
| 5,090,713 | 2/1992 | Johnson | 277/648 |
| 5,195,754 | 3/1993 | Dietle | 277/27 |
| 5,195,757 | 3/1993 | Dahll . | |
| 5,201,531 | 4/1993 | Lai | 277/400 |
| 5,222,743 | 6/1993 | Goldswain et al. | 277/400 |
| 5,230,520 | 7/1993 | Dietle et al. . | |
| 5,322,299 | 6/1994 | Terai | 277/596 |
| 5,380,016 | 1/1995 | Reinsma et al. | 277/503 |
| 5,454,572 | 10/1995 | Pospisil | 277/400 X |
| 5,496,047 | 3/1996 | Goldswain et al. | 277/400 |
| 5,498,007 | 3/1996 | Kulkarni et al. | 277/400 |
| 5,678,829 | 10/1997 | Kalsi et al. . | |
| 5,681,048 | 10/1997 | Tronel | 277/592 |
| 5,738,358 | 4/1998 | Kalsi et al. . | |
| 5,823,541 | 10/1998 | Dietle et al. | 277/320 |
| 5,873,576 | 2/1999 | Dietle et al. . | |

FOREIGN PATENT DOCUMENTS

| | | | |
|---|---|---|---|
| 56-150661 | 11/1981 | Japan . | |
| 499480 | 1/1939 | United Kingdom . | |
| 1215221 | 12/1970 | United Kingdom | 277/345 |
| 95/03504 | 2/1995 | WIPO . | |
| 97/01721 | 1/1997 | WIPO . | |

OTHER PUBLICATIONS

Ayala et al, "Seal Design for Reduced Wear in Abrasive Slurries", Proceedings from 1997 ASME Fluids Engineering Division Meeting, Jun. 1997.

Ayala et al, "Wear of elastomeric seals in abrasive slurries" WEAR 220, Elsevier Science S. A., pp. 9–21, 1998.

Langford et al, "A New Hydrodynamically Lubricated Bearing Seal for Improving Rock Bit Performance", ASME reprinted from PD–vol. 27, Drilling Technology Symposium, 1990.

Horve, L., Shaft Seals for Dynamic Applications, Marcel Decker, Inc. New York, pp. 338, 339, 1996.

Roberts "No Gap" Piston Rings specification sheet, Roberts Manufacturing Company, St. Louis, Missouri. Mar. 1943.

*Primary Examiner*—Lynne H. Browne
*Assistant Examiner*—Greg Binda
*Attorney, Agent, or Firm*—Medlen & Carroll, LLP

[57] ABSTRACT

A contact surface of a seal having textured features is described. The contact surface seals properly and is resistant to wear. The contact surface is able to perform in very severe environments, such as those found in earthmoving applications.

46 Claims, 10 Drawing Sheets

TEXTURED SEAL FOR REDUCED WEAR

FIELD OF THE INVENTION

The present invention relates generally to seals, and more particularly to a significantly improved mechanical seal to improve lubrication and minimize wear and leakage.

BACKGROUND

Seals, such as axial seals for bushings, are commonly used in the endless tracks of track-type earthmoving vehicles. In relatively clean environments, a small amount of inward radial load is required on the sealing lip to seal in the bearing lubricant. However, as the operating environment becomes dirtier and more severe, higher lip loads are required to ensure good sealability and to keep the abrasive contaminants out.

The track bushings used in the endless tracks of earthmoving vehicles and the radial lip seals used in the pin joints of the loader linkages of earthmoving vehicles present one of the most severe operating environments possible for these kind of seals. In such extremely severe applications, abrasive contaminants such as mixtures of sand, dirt and water enter the joint and become lodged under the seal lip. Abrasives lodged under the seal lip quickly grind a groove into the pin/bushing and/or the seal and quickly wear out the seal lip and consequently the pin/bushing. This wear mechanism is the primary mechanism controlling the life of the seal.

The track bushings in the hinge joints of the endless tracks of earthmoving vehicles require a face seal to be subjected to a very high axial force in order to prevent the highly abrasive contaminants from being lodged under the seal lip. In radial lip seals, garter springs have been frequently employed about the seal lip to increase the inward radial load on the lip so as to enhance its sealing ability. Unfortunately, increasing axial force acts to limit the amount of lubricant reaching the contact surface, accelerating the deterioration of the seal.

What is needed is a mechanical seal that seals properly and is resistant to wear. Such a seal should be able to perform in very severe environments, such as those found in earthmoving applications.

SUMMARY OF THE INVENTION

The invention encompasses the use of textured features on the contact surface of a seal to decrease the wear rate of mechanical seals caused by exposure to revolutions per minute or as a function of cycles of oscillations. The textured features of the present invention can serve to prevent incursion of dirt into the seal.

Though the mechanism is not intended to limit the scope of the invention, it is believed that by placing the textured features interior to the outer edge of the contact surface of the seal, localized high pressure points create a barrier to dirt; moreover, dirt that comes in contact with the textured features breaks up. The textured features can be deformed by the pressure placed on the surface of the seal face, and, therefore, serve as fluid wells to introduce lubricant to the contact surface. The number and interspacing of the textured features is a function, in part, of the extent and nature of the rotation of the seal surface.

The present invention encompasses devices and methods for producing a seal. In one embodiment of the device of the present invention, the present invention contemplates a seal, said seal having a contact surface with an inner peripheral edge and an outer peripheral edge, said contact surface being characterized by textured features interior to said outer peripheral edge. While the present invention is not limited by the shape of the seal, in some embodiments, the outer peripheral edge is curved, while in other embodiments, the outer peripheral edge is straight. In a preferred embodiment, the outer peripheral edge is raised.

The textured features can be protrusions, protrusions with recesses, indentations, or a combination thereof. In one embodiment, the textured features are interspaced at a distance of one fourth the distance said contact surface travels in one oscillation. While not intended to limit the scope of the invention, in one embodiment, the textured features are interspaced equidistantly. In such an embodiment, the preferred spacing of the protrusions to the circumference of the seal is approximately 1:200 to 1:50.

Though the present invention is not limited to the form of the protrusions, they may have a conical or cylindrical shape and a cross-sectional configuration of a polygon, circle, ellipse or a combination thereof. In an embodiment with protrusions, the protrusions may be identical in size and shape. In yet another embodiment, the textured features are oriented in a direction perpendicular to said contact surface.

While the dimension of the recesses and protrusions do not limit the present invention, the depth of the recess to the outer diameter of the protrusion can be approximately 0.3:1 to 1.3:1 and the outer diameter of the recess to the diameter of the protrusions can be approximately 0.15:1 to 0.5:1.

While the present invention is not limited to the material from which the seal is constructed, the seal may be comprised of an elastomeric material i.e., material resembling rubber such as polymers (polyvinyl, polyurethane, etc.), including but not limited to thermoplastic material. In such an embodiment, the protrusions and indentations may be of unitary construction and formed by integrally molding the elastomeric material.

It is not intended that the present invention be limited to the particular nature of the industrial application for the textured seals of the present invention. While textured seals are herein contemplated for circular and oscillatory motion, textured seals for linear motion are explicitly contemplated.

A variety of industrial applications involve linear motion. For example, the invention contemplates textured seals for slidably contacting surfaces such as those found in cylinder seals. In one embodiment, the textured seals of the present invention are used with cylinders that are pneumatic cylinders. In the preferred embodiment, the seals of the present invention are employed with hydraulic cylinders.

While the present invention is not limited by the particular design of the hydraulic cylinder, typically it has fluid lines, adjustable stroke, and piston cushioning features. As is typical in the art, the cylinder is closed on one end by a head and on the fluid input end by a cap. In one embodiment, a piston is mounted within the cylinder and includes a threaded, hollow piston rod which extends through the head and extends from one end of the hydraulic cylinder. While the present invention is not limited by the location of the seal in such a device, commonly the seal is set between the piston and the cylinder. In operation, the body of the cylinder remains stationary while the rod end moves.

Another embodiment of the present invention contemplates a seal, comprising a resilient seal ring having a cylindrical configuration, said seal ring having a contact surface, an inner peripheral edge and an outer peripheral edge, said contact surface being characterized with a textured features interior to said outer peripheral edge. While not intended to limit the present invention, the seal ring and protrusions may have the same characteristics as described above.

The present invention also contemplates an assembly, comprising a first surface having an outer peripheral edge and textured features interior to said outer peripheral edge, with a second surface, said second surface being substantially flat and pressed against said first surface to produce a seal. In a preferred embodiment, the outer peripheral edge is raised and the protrusions are comprised of the same material as the first surface. Though the present invention is not limited to the material from which the first surface is constructed, the textured features may be shaped and spaced and the first surface may be constructed of a material as for the seals described above. Furthermore, while not intended to limit the scope of the present invention, the protrusions on the first surface may be biased towards the second surface. Alternatively, the textured features may be distributed on the second surface such that they are biased against the first surface interior to the outer peripheral edge of said first surface.

One embodiment of the methods of the present invention comprises providing an assembly as described above, a compression means, and compressing the first surface against the second surface under conditions such that a seal is produced. Additional embodiments of the present invention further comprise a surface movement means and, after said compressing, moving at least one of said first and second surfaces with said surface movement means. While not intended to limit the invention to any one type of motion, such motion can be linear motion of one surface against the other surface. Alternatively, the motion can be circular or oscillating.

It must also be understood that although the preferred shape of a protrusion and/or a recess is a cylindrical shape, various other alternate embodiments are envisioned and encompassed in this invention.

In one aspect of the present invention, a seal having a textured sealing surface is disclosed. The seal comprises a mounting ring. A seal ring is bonded to the mounting ring. The seal ring has an inner peripheral edge, an outer peripheral edge, and a contact surface between the inner and outer peripheral edges. A plurality of circumferentially located protrusions are formed on the contact surface.

In another aspect of the present invention, a seal construction for sealing between a pair of components in relative rotational motion with respect to one another, is disclosed. The seal construction comprises a mounting ring. The mounting ring is fixed relative to a first component. The seal construction also comprises a seal ring bonded to the mounting ring. The seal ring has an inner peripheral edge, an outer peripheral edge, and a contact surface between the inner and outer peripheral edges. A portion of the contact surface adjacent one of the outer and inner peripheral edges is biased towards a second component. The seal construction also comprises a plurality of circumferentially located protrusions formed on the contact surface.

In yet another aspect of the present invention, a track seal for the track hinge joint of an endless track for a track-type earthworking machine is disclosed. The track seal comprises a rigid mounting ring having a cylindrical configuration. The track seal also comprises a resilient seal ring bonded to the mounting ring. The seal ring has an inner peripheral edge, an outer peripheral edge, and a contact surface between the inner and outer peripheral edges. The track seal further comprises a plurality of circumferentially located protrusions formed on the contact surface. A recess is formed within at least a portion of the plurality of protrusions.

In still another aspect of the present invention, in a seal having a rigid mounting ring and a seal ring bonded to the mounting ring, the seal ring having an inner peripheral edge, an outer peripheral edge, and a contact surface between the inner and outer peripheral edges, the seal ring being constructed from an elastomer, and the seal being adapted to seal by biasing at least a portion of the contact surface adjacent one of the outer and inner peripheral edges of the seal ring against another component, an improvement is disclosed. The improved seal comprises a plurality of circumferentially located protrusions formed on the contact surface. At least a portion of the protrusions have a recess formed therein. The protrusions are spaced in a geometrically symmetrical pattern on the sealing surface.

DEFINITIONS

Figure 1A:
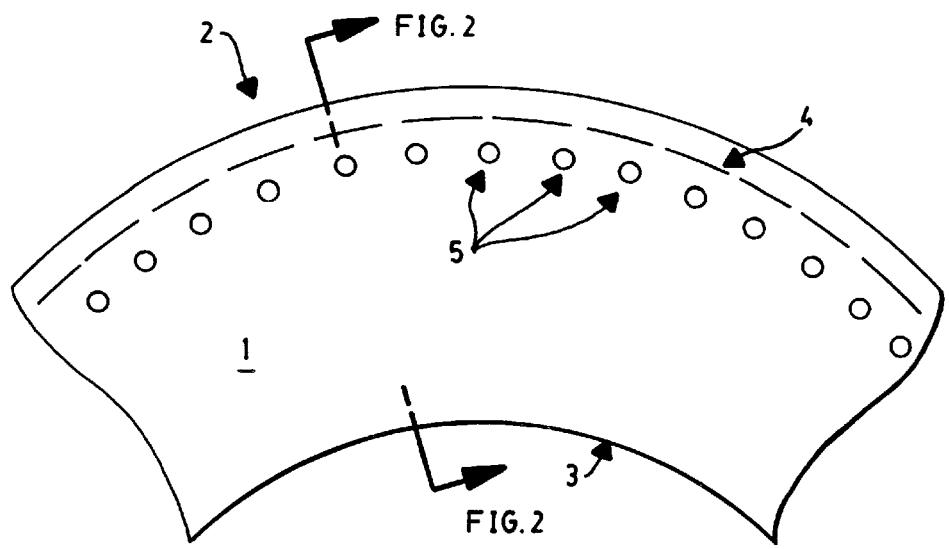
FIG. 1a hows a partial plan view of the curved contact surface of one embodiment of the seal of the present invention.

The term "contact surface", as used herein, means the surface of a seal component (such as the surface of a seal ring) that is intended to be biased against a second surface to form a seal.

As used herein the term "outer peripheral edge", means the edge of the contact surface which is exposed to the harsh environment of dirt, debris, mud and other abrasive particles which would tend to wear the seal. When dirt and debris enters the seal from the outer edge, it comes up against a region of intensified contact on the contact surface where a "contact band" is defined.

The term "inner peripheral edge", as used herein, means the edge of the contact surface which is exposed to a clean environment such as clean air or lubricating oil.

The term "raised edge" means that the edge of the seal rises above the plane of the contact surface.

The term "textured feature" refers to a protrusion, a protrusion with a recess, indentations and/or combinations thereof.

The term "protrusion" as used herein refers to a bump, bulge, hump, lump, knob of various shapes and sizes that extends upward and/or outward from the plane of the contact surface.

The term "recess" as used herein refers to a void, hole, space, cavity, dent, crater, depression, hollow, or impression of various shapes and sizes extending downward and/or inward into a protrusion.

The term "rim" as used herein refers to the lip-like region created at the top of a protrusion when a recess is formed therein. In this embodiment, the recess with the rim can provide a lubrication "well" for the continuous introduction of small amounts of lubricant into the contact surface.

The term "indentation" as used herein, refers to a void, hole, space, cavity, dent, crater, depression, hollow, or impression that is formed in the contact surface (as distinct from recesses in protrusions).

The term "circumferentially located" as used herein refers to the placement of textured features toward the outer edge of the contact surface and in a manner whereby they are out of the plane of the contact surface (e.g., perpendicular) as opposed to being placed radially (i.e., in the plane of the contact surface). It is preferred that the textured features be placed interior to the contact band and at intervals (i.e., with spacings between the textured features).

The term "rotating" as used herein refers to a motion whereby an object turns on an axis in a single direction. Though the present invention works particularly well at operation of low rotations per minute (i.e., 60–120 per minute), it is contemplated that the methods and devices of the present invention also can be used at higher rotations per minute.

The term "oscillate" as used herein refers to a motion whereby an object moves in one direction for a distance before pausing and/or moving in the opposite or another direction for a distance. Preferably, the spacing of the textured features correspond to one quarter of the distance travelled by the seal face in one oscillation. In one embodiment they are interspaced at 2.0 to 2.5 millimeter intervals.

The term "thermoplastic" as used herein refers to a material that is hard at ambient temperature yet is capable of becoming soft when heated and returns to being hard when cooled.

The term "elastomeric material" or "elastomer" as used herein refers to a rubber-like material.

The term "unitary construction" refers to an association of elements of the invention such that they are formed from the same piece of raw material without the need for further integration.

The term "integrally molding" as used herein refers to the method of casting such that features are of unitary construction.

The term "compression means" refers to any means of pressing surfaces together.

The phrase "seal is produced" refers to the compression of surfaces with an intention to or resulting in a substantial exclusion of solid or fluid from between those surfaces.

The term "surface movement means" refers to a means for causing a surface (such as a seal surface or surface against which a seal surface is biased) to change position relative to another surface or object.

DESCRIPTION OF THE INVENTION

Referring now to FIG. 1a one embodiment of the present invention 1 is shown. In this embodiment, the contact surface of the seal is curved. Seal 1 has an outer peripheral edge 2, and inner peripheral edge 3 and a contact band 4. A plurality of circumferentially located protrusions 5 located interior to the outer peripheral edge (and interior to the contact band) are shown. The section line indicates the plane upon which the sectional views of Firs. 2a–2h are projected.

Figure 1B:
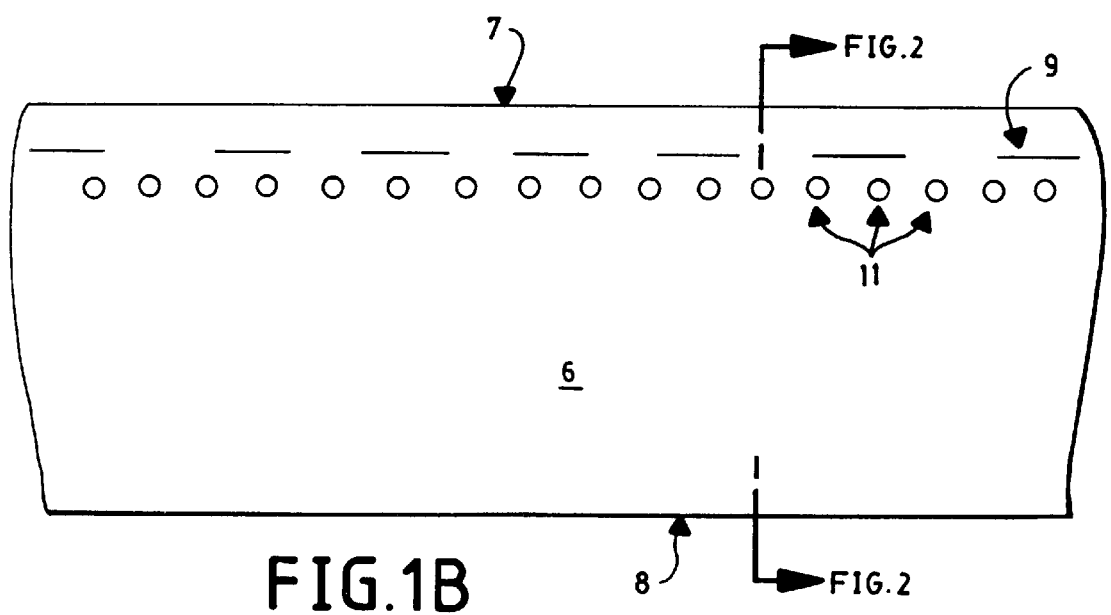
FIG. 1b shows a partial plan view of the straight contact surface of one embodiment of the seal of the present invention.

Referring now to FIG. 1b, another embodiment of the present invention 6 is shown. In this embodiment, the contact surface of the seal is straight. Seal 6 has an outer peripheral edge 7, and inner peripheral edge 8 and a contact band 9. As in FIG. 1a a plurality of protrusions 11, are formed on the contact surface interior to the outer peripheral edge (and interior to the contact band). The section line indicates the plane upon which the sectional views of FIGS. 2a–2h are projected.

Figure 2A:
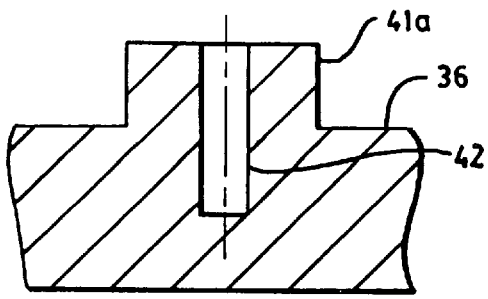
FIG. 2a, FIG. 2b, FIG. 2c, (FIG. 2d, FIG. 2e, FIG. 2f, FIG. 2g, FIG. 2h and while not limiting the scope of the present invention, show various embodiments of the shapes of the textured features of the present invention.
Figure 2B:
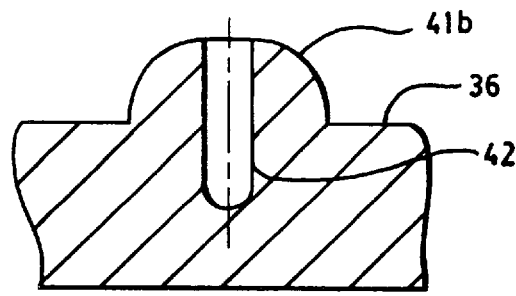
Figure 2C:
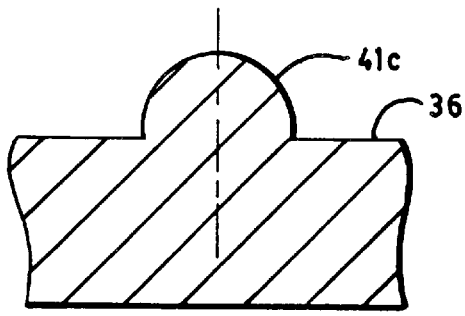
Figure 2D:
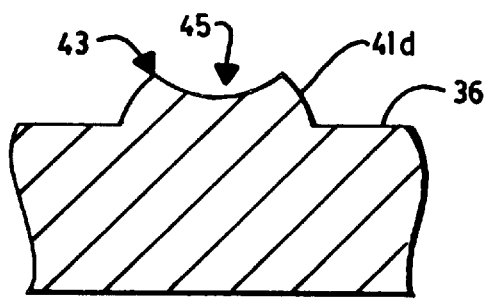
Figure 2E:
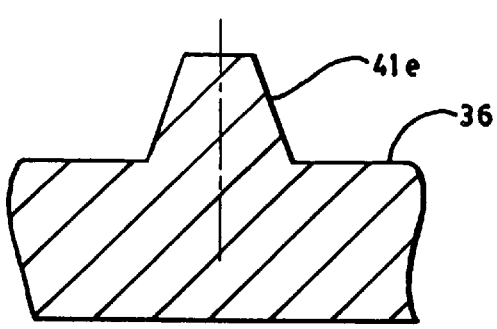
Figure 2F:
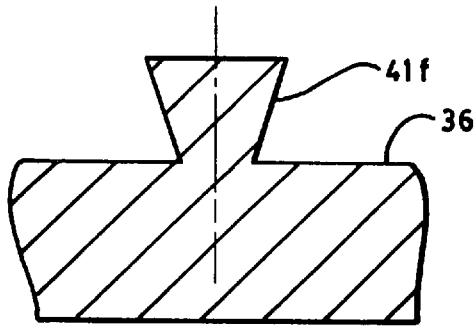
Figure 2G:
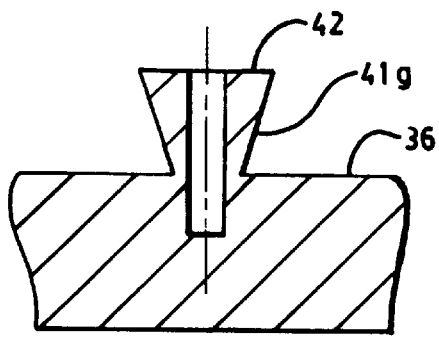
Figure 2H:
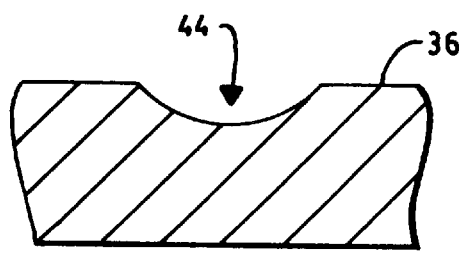

Referring now to FIG. 2a, FIG. 2b, FIG. 2c, FIG. 2d, FIG. 2e, FIG. 2f FIG. 2g, and FIG. 2h, while not intended to limit the size and shape of possible protrusions, indentations and recesses and indentations, various alternate shapes of the protrusions, indentations and recesses are shown on a contact surface 36. FIG. 2a shows a cylindrical shaped protrusion 41 with a cylindrical shaped recess 42. FIG. 2b shows a hemispherical shaped protrusion 41 with a cylindrical shaped recess 42. FIG. 2c shows a hemispherical protrusion 41 without a recess. FIG. 2d shows a cylindrical protrusion 41 with a recess 45. FIG. 2e shows a conical shaped protrusion 41 without a recess. FIG. 2f and FIG. 2g show a conical shaped protrusion without and with a recess respectively. FIG. 2h is an example of an indentation, 44, into the contact surface, 36.

In the preferred embodiment of the present invention, the plurality of protrusions are formed interior to the outer peripheral edge of a seal ring which is biased against a sealing surface. The placement of the circumferentially located protrusions adjacent but interior to the outer peripheral edge is preferable because these protrusions provide a point of intensified contact that redirects the incoming dirt and debris particles out of the contact band and into the low pressure areas. This washes away the abrasive particles and prevents them from accumulating in the contact band. Since the particles do not accumulate in the contact band, the wear is significantly reduced. For example, in a D10 track seal the contact band at the nominal face load of 500 pounds is 1.6 millimeters. The innermost part of the textured features is 1.2 millimeters from the edge of the seal lip.

In some cases, the placement of the textured features inside of the contact band may require that the size of the textured features be customized to suit the nature of the seal. For example, while not intended to limit the scope of the present invention, for seals that have a small contact band, the corresponding textured features should be smaller. If the smallest textured feature possible (i.e., according to the limits of manufacturability) is still too big for the contact band, the textured feature may be placed partly within the contact band. Ideally, the spacing between textured features should follow the size of the patterns. While the present invention is not intended to be limited by a precise mechanism, it is believed that the textured features of the seal break up dirt particles and disperses clumps of dirt that roll up into the contact band. To maintain their effectiveness in this function, the textured features should to be smaller than the distance traveled by the fronts of entering dirt. For a D10 track seal, for example, it was found that this distance should be between 2 and 5 millimeters.

Figure 3:
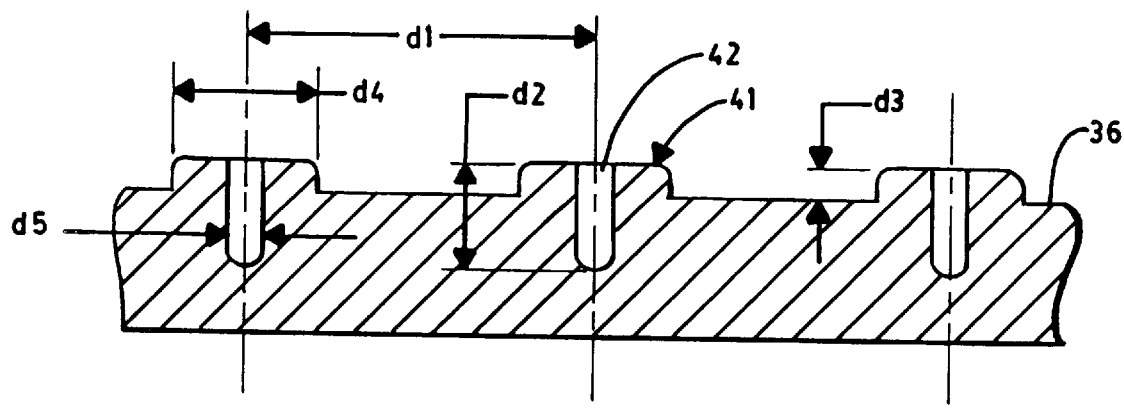
FIG. 3 is a diagrammatic representation, in cross-section, of the textured surface, according to one embodiment of the present invention.

Referring now to FIG. 3 which shows the geometrical relationships between the various dimensions of the protrusions and the recesses formed therein, the spacing between successive protrusions is designated as d1. The depth of a recess is designated as d2. The height of the protrusion measured above the contact surface is designated as d3. The diameter of a protrusion having a circular cross sectional configuration is designated as d4. The diameter of a recess having a circular cross sectional configuration is designated as d5. In the preferred embodiment, each protrusion has a cylindrical shape and a circular cross sectional configuration.

In one embodiment of the present invention, the ratio of the depth d2 of the recess to the outer diameter d4 of the protrusion is in the range of desirably about 0.3:1 to about 1.3:1, and preferably about 1:1. The ratio of the depth d2 of the recess to the perpendicular distance d3 between the third surface of the protrusion and contact surface is desirably in the range of about 2:1 to about 8:1, and preferably about 4:1. The ratio of the diameter d5 of the recess to the outer diameter d4 of the protrusion is desirably in the range of about 0.15:1 to about 0.5:1, and preferably about 0.25:1. The above geometrical relationships are desirable because it has been observed that these relationships contribute to the textured seal of the present invention exhibiting a very high wear life as compared to a non-textured seal, as will be shown in the test data disclosed in the following paragraphs.

In one embodiment, the protrusions are equidistantly spaced apart from one another. Referring again to FIG. 3, the ratio of the equidistant spacing d1 between successive protrusions to the circumference of the circle upon which these protrusions are circumferentially formed on said sealing ring is desirably in the range of about 1:200 to about 1:50, and more desirably in the range of about 1:125 to about 1:90, and preferably about 1:103. The above equidistant spacing is desirable because the results of the experiments carried out in which the geometry, as well as the location, of the protrusions was varied showed that this spacing is the optimal spacing for producing the highest wear resistance and greatest lubricating properties.

Figure 4:
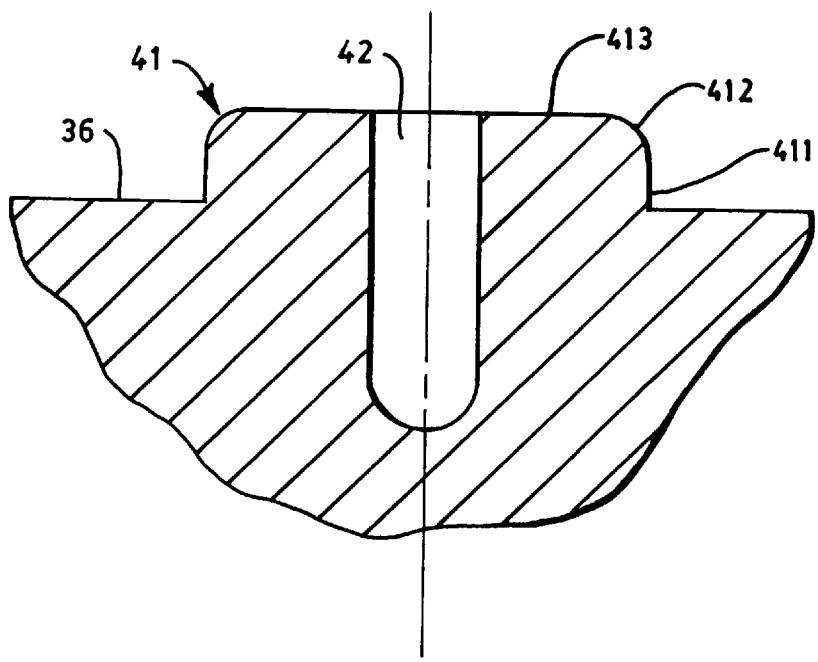
FIG. 4 is an enlarged portion of the seal shown in FIG. 3.

Referring now to FIG. 4, the protrusion has a first surface 411, a second surface 412 and a third surface 413. The first surface is perpendicular to the contact surface 36. The second surface is curved and connected to the first and third surfaces. The third surface is parallel to the contact surface 36. Preferably, the recess 42 is formed concentrically within the protrusion. Desirably, the recess extends in a direction perpendicular to the third surface 413 of protrusion 41.

Figure 5:
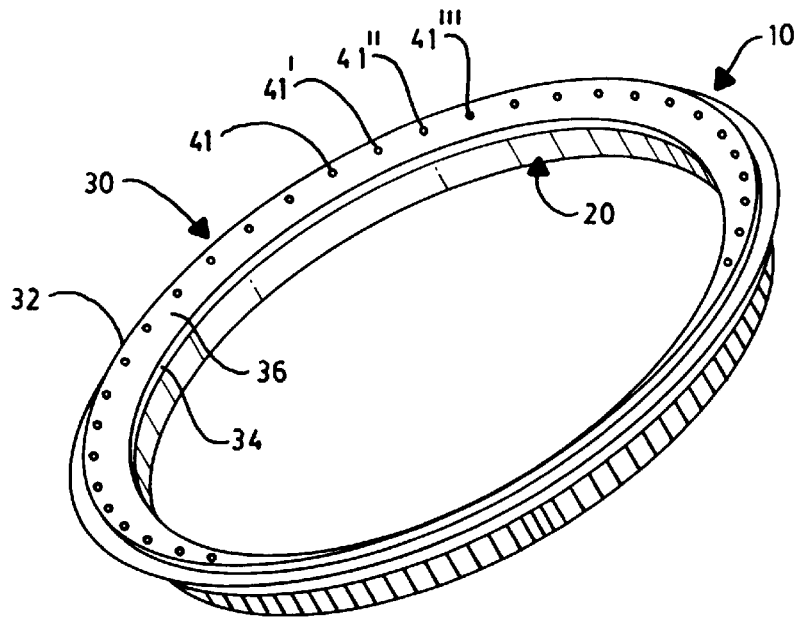
FIG. 5 is a diagrammatic representation of another embodiment of the present invention, a track seal.

Referring now to FIG. 5, another embodiment of the present invention 10 is shown. Seal 10 has a mounting ring 20, a seal ring 30 bonded to mounting ring 20, an outer peripheral edge 32, and inner peripheral edge 34 and a contact surface 36. A plurality of circumferentially located protrusions 41,41",41Δ,41''' are formed on the contact surface.

Figure 6A:
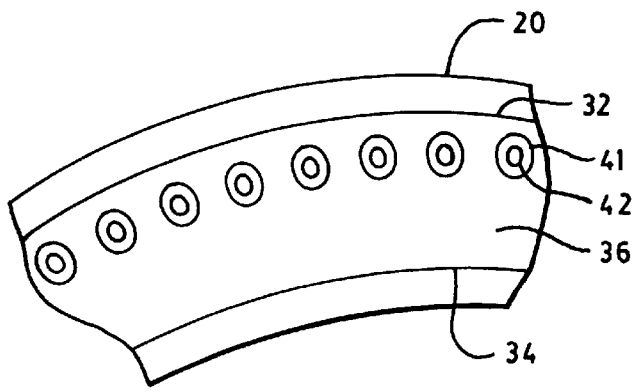
FIG. 6a, is an enlarged top view of a portion of the track seal shown in FIG. 5.

Referring now to FIG. 6a, which shows another embodiment of the seal of the present invention, each of the plurality of protrusions 41 respectively has a recess 42 formed therein. Preferably, the recess 42 is formed concentrically within the protrusions 41.

Figure 6B:
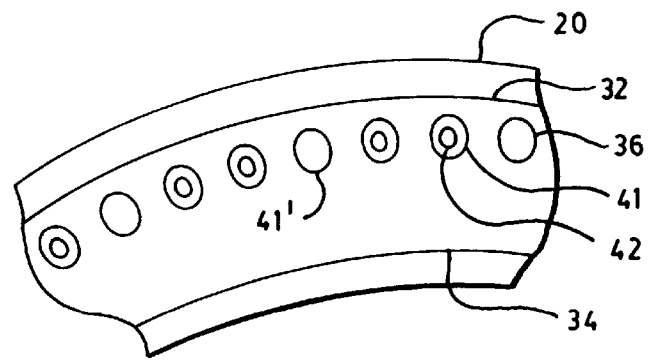
FIG. 6b is an enlarged top view of a portion of a track seal, according to another embodiment of the present invention.

Referring to FIG. 6b, which shows an alternate embodiment of the present invention, the contact surface 36 has a plurality of protrusions 41. In the alternate embodiment, a recess is formed in a portion of the plurality of protrusions.

In one embodiment of the present invention, the mounting ring is of a cylindrical configuration and made from a rigid, organic, plastic material. The seal ring is of a cylindrical configuration and made from an elastomeric material (e.g., a rubber-like material, polyvinyl, polyurethane, thermoplastic, etc.). Such materials are well known to those skilled in the art and need not be discussed in any further detail here. In another embodiment, the protrusions and the recesses are formed on the contact surface by integrally molding these protrusions and recesses into the seal ring.

Figure 7:
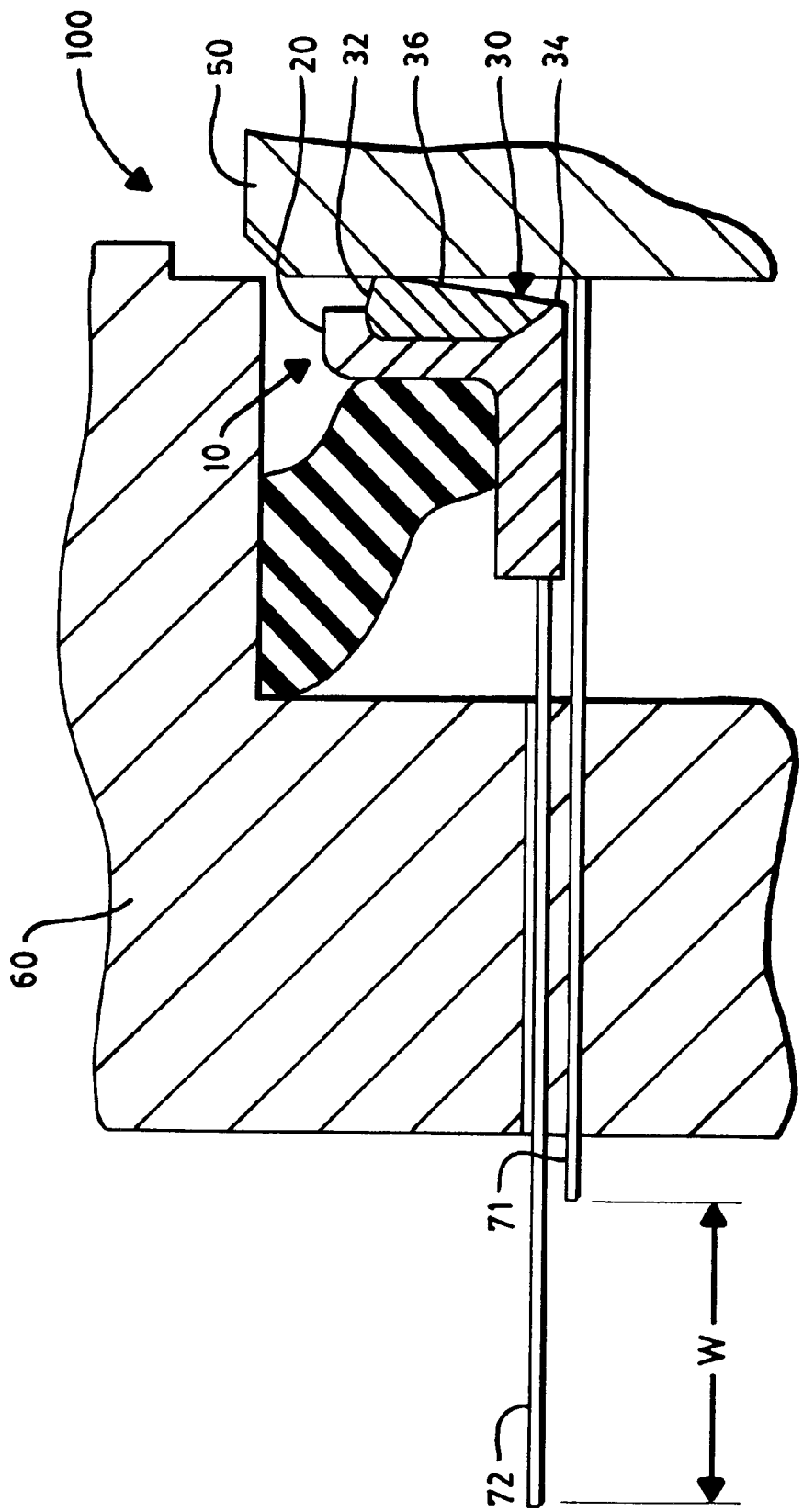
FIG. 7 is a diagrammatic representation, in cross-section, of the apparatus used to measure the seal lip wear.

Referring to FIG. 7, an apparatus 100 is shown. The apparatus 100 was used for measuring the seal wear as a function of time. To demonstrate that abrasive particles in soil and mud accelerated the wear of the seal lip, apparatus 100 includes a rotatable fixture 60 within which a face seal 10 is mounted. Seal 10 has a mounting ring 20, a seal ring 30, an outer peripheral edge 32, an inner peripheral edge 34, and a contact surface 36. The seal is biased against a bushing 50 at a surface adjacent the outer peripheral edge 32. The area of the contact surface where the seal is biased against the bushing is called a contact band. The bushing 50 is a steel bushing. An electric motor, not shown in the figure, is connected to the steel bushing and rotates the steel bushing with respect to the seal. The seal can be submerged in a bath of mud. The wear is measured by a pair of slender metal rods 71,72. One rod is connected to the seal 10 and the other rod is connected to the bushing, and the amount of wear is measured by monitoring the incremental increasing distance w between the respective ends of the slender metal rods 71,72 as shown in FIG. 7.

EXAMPLE A

A seal was mounted in an apparatus shown in FIG. 7. The seal was biased against a steel bushing. The seal lip thickness under load was 1 mm at the beginning of the experiment. The steel bushing was oscillated ±20°. Two separate experiments were done with this setup to show how the seal wore as a function of the number of oscillations of the seal face when (i) the seal was submerged in a mud bath and (ii) when the seal was not submerged in a mud bath.

Figure 8:
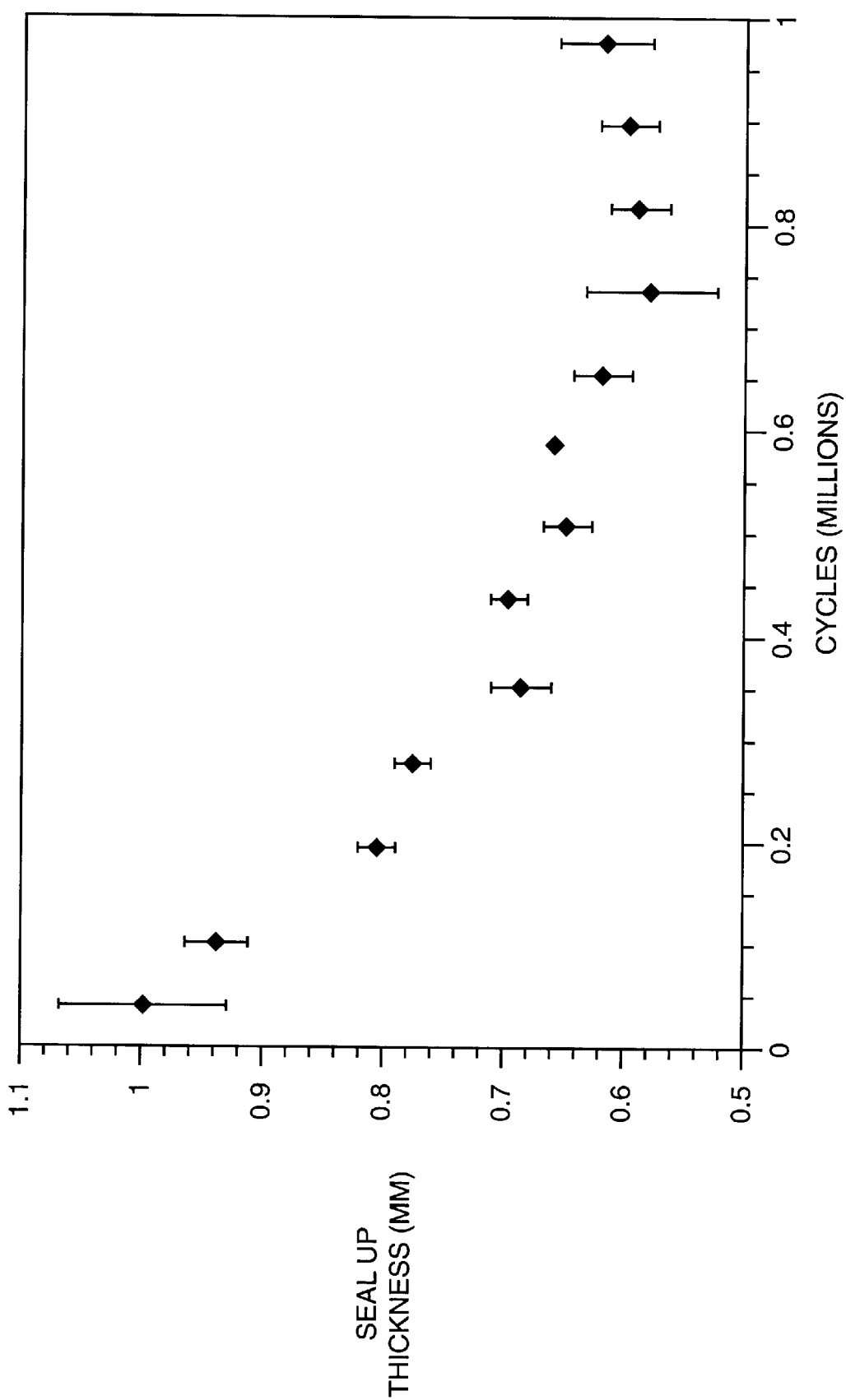
FIG. 8 is a graphical representation of the seal lip wear as a function of oscillation cycles, when a non-textured seal is oscillated for 0.94 million cycles against a steel plate submerged in a mud bath.

Referring now to FIG. 8, it is seen that the seal lip wore rapidly as the number of oscillations increased when the seal was submerged in a mud bath. The seal lip thickness, which was 1 mm at the beginning of the test, dropped down to about 0.65 mm at half a million cycles and at 1 million cycles, averaged about 0.6 mm. Thus, 40% of the seal had worn at about 1 million cycles.

Figure 9:
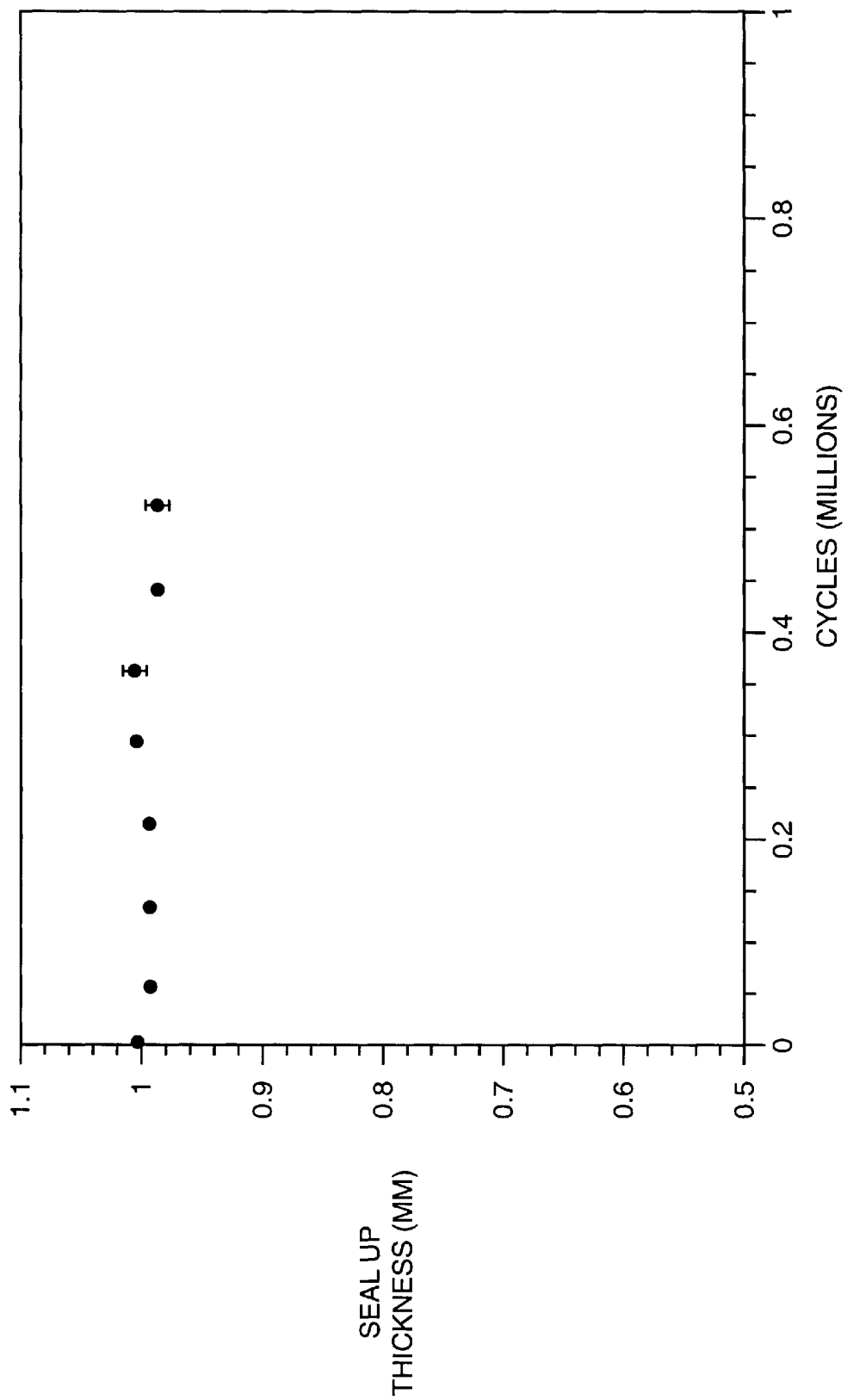
FIG. 9 is a graphical representation of the seal lip wear as a function of oscillation cycles, when a non-textured seal is oscillated for 0.53 million cycles against a steel plate, but without being submerged in a mud bath.

Referring now to FIG. 9, it is seen that the seal lip thickness, as a function of the number of cycles, remained constant when the seal was not submerged in a mud bath. The test was stopped after half a million cycles because there was no appreciable reduction in the thickness of the seal lip.

Figure 10:
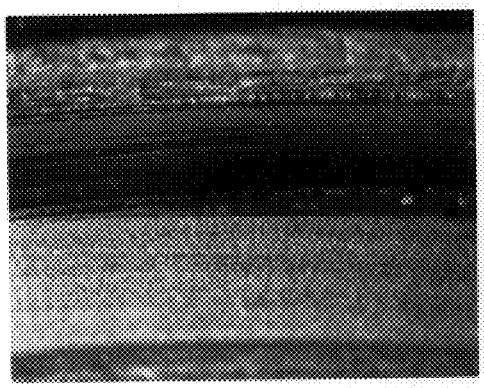
FIG. 10 is a photomicrograph showing a magnified view of the wear band of the non-textured seal lip of FIG. 8, after wear in a mud bath.
Figure 11:
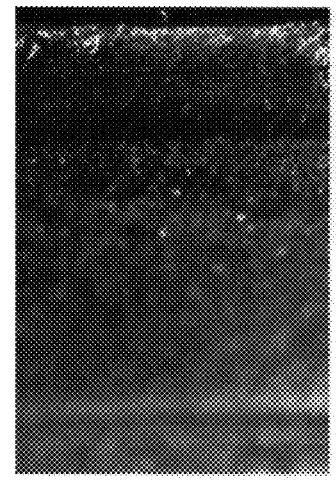
FIG. 11 is a photomicrograph showing a magnified view of the wear band of the non-textured seal lip of FIG. 9, after wear but without submersion in a mud bath.

It was thus concluded that sand and clay particles, and other abrasive media present in the mud, accelerated the wear of the seal. It was concluded that these abrasive particles formed a penetrating front which penetrated the seal wear band, formed by the contact of the seal lip against the bushing, from the outside to the inside and caused the seal to wear rapidly and lose its sealing properties. It was observed that the wear in the seal took place in two stages. In the first stage, small particles entered the seal lip contact surface and wore away the seal lip leaving a smooth surface. As the seal lip wore further, bigger particles entered the seal lip contact surface and wore down the seal by creating grooves and cracks. Further wear of the seal was caused by the attachment of the abrasive particles to one of the surfaces. FIG. 10 shows the photomicrograph of the seal wear band of the seal tested in the presence of mud. FIG. 11 shows the seal wear band of the seal tested without mud at the end of the experiment.

EXAMPLE B

In this example, a seal was biased against a flat glass plate and a video camera was used to continuously monitor the seal wear band in real time. The seal had a outer diameter of about 83 mm and an inner diameter of about 73 mm. The width of the seal face contact band when it was biased against the glass plate, was about 1.5 mm. About one hundred protrusions were formed on the contact surface and these protrusions were circumferentially located on the contact surface at a equidistant spacing of about 2.5 mm. Each protrusion had a recess formed therein. The recess had a depth of about 0.65 mm. The protrusions had a height of about 0.15 mm and an outer diameter of about 0.65 mm. These protrusions were formed circumferentially on the contact surface adjacent the outer peripheral edge of the seal ring. The seal was oscillated ±20° which translated into a circumferential travel of about 14 mm across the face of the glass plate. When the seal was biased against the glass plate, a portion of the contact surface and a portion of the protrusions were biased against the glass plate.

Two identical sets of experiments were conducted, one with the seal having the protrusions as shown above and the other without any protrusions. In both the experiments, the seals were submerged in a mud bath. The size of the wear contact band for the textured seal and the plain seal were recorded as a function of the number of cycles.

The amount of wear incurred by the seal was calculated as follows: the total wear was determined by dividing the width of the wear band by the width of the initial contact band.

The term "wear band", as used herein, means the wear patch formed on the contact surface as the dirt and debris began to wear the seal. As the seal wore, the wear band, which had an initial contact band width of 1.5 mm, incremental grew larger.

Figure 12:
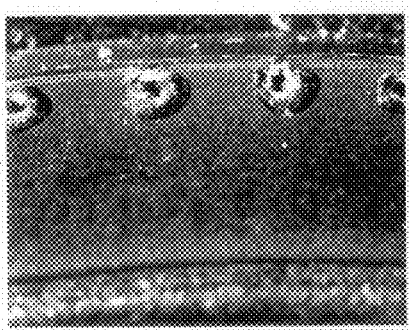
FIG. 12 is a photomicrograph showing a magnified view of the wear band of the textured seal lip of the present invention, after being oscillated for 0.5 million cycles against a glass plate in a mud bath.
Figure 13:
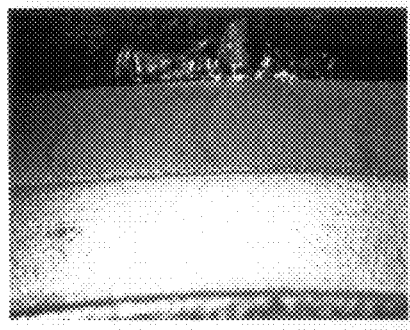
FIG. 13 is a photomicrograph showing a magnified view of the wear band of the non-textured seal lip, after being oscillated for 0.5 million cycles against a glass plate, in a mud bath.
Figure 14:
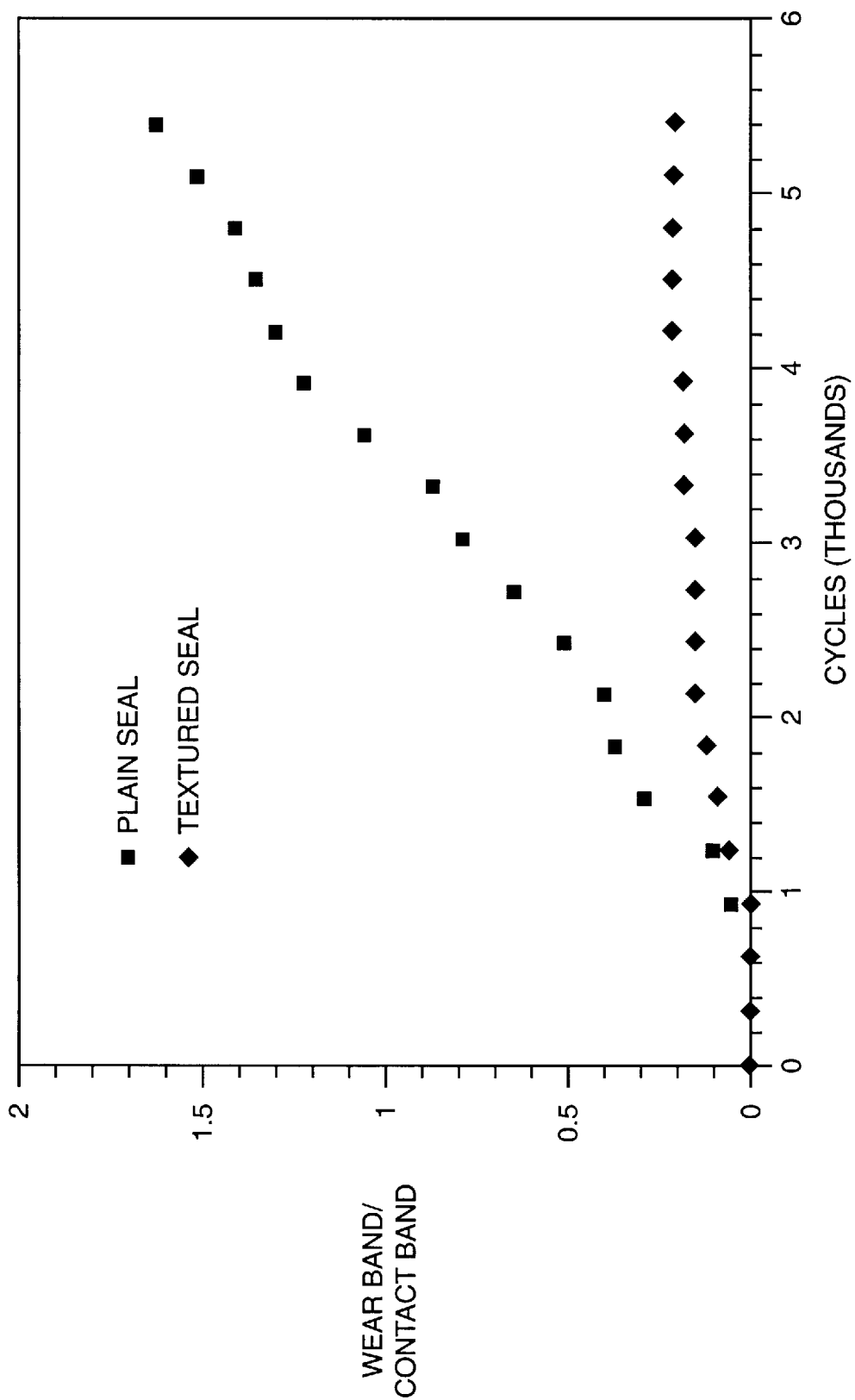
FIG. 14 is a graphical representation of the comparison of seal lip wear as a function of oscillation cycles, between the textured seal of the present invention and a non-textured seal.

FIGS. 12 and 13 show the magnified photomicrographs of the wear bands of contact surfaces of the textured and the non-textured seal after being tested in a mud bath for 500,000 cycles and 940,000 cycles respectively. FIG. 14 shows a graph wherein the amount of wear is shown as a function of the number of cycles for a plain and a textured seal.

Looking at FIG. 14, it can be seen that the textured seal exhibited a wear of about 0.2 at the end of about 540,000 cycles, whereas a plain seal exhibited a wear of about 1.6 at 540,000 cycles. Because the initial contact band width of both the plain and textured seals was 1.5 mm at the beginning of the experiment, this means that the width of the textured seal wear band was 0.2 times 1.5, i.e., 0.3 mm, whereas the width of the plain seal wear band was 1.6 times 1.5, i.e., 2.4 mm. Thus, for the same number of cycles when tested in the same environment, the textured seal exhibited about 800% reduced wear as compared to the non-textured or the plain seal.

EXAMPLE C

In a separate test, another textured seal identical to the one used in Example B was tested using the same conditions, for 10 million cycles. The wear observed at the end of 10 million cycles for that textured seal was 0.27. Thus, the textured seal had a wear band width of about 0.27 times 1.5, i.e., 0.4 mm. This represents a significant improvement in the wear life of a seal using the improvement according to the present invention as compared to a plain seal.

EXAMPLE D

In one embodiment of the present invention, a seal having a textured sealing surface comprises a mounting ring. A seal ring is bonded to the mounting ring and the seal ring has an inner peripheral edge and outer peripheral edge and a contact surface between the inner and outer peripheral edges. A plurality of circumferentially located protrusions are formed on the contact surface. In this embodiment, a recess is formed within at least a portion of the plurality of protrusions and preferably a recess is formed within all of the protrusions. The protrusions improve both the seal lubrication and the wear resistance by distributing more oil lubricant at the seal interface and by interfering with the entering front of dirt and debris particles. The formation of a recess within the protrusion is preferred because the oil trapped in the recess is distributed to the contact surface as the seal oscillates back and forth. This additional lubricant present in the recess is delivered directly to the contact band of the interface between the contact surface and the surface that the contact surface is biased against. Consequently, the formation of the recess within the protrusion improves the lubrication and reduces friction.

In one embodiment of the present invention, the plurality of protrusions desirably have one of a cylindrical or a conical shape, and preferably a cylindrical shape. The plurality of protrusions also have a cross sectional configuration desirably selected from one of polygon, circle, ellipse or combinations thereof. Preferably the protrusions have a cross sectional configuration of a circle. In this embodiment, the recess desirably has one of a cylindrical or a conical shape, and preferably a cylindrical shape. The recess also has a cross sectional configuration desirably selected from one of polygon, circle, ellipse or combinations thereof, and preferably a circle.

In one embodiment of the present invention, the plurality of protrusions are identical to one another in shape and size. It is desirable to have the protrusions which are the same in shape and size because the protrusions provide a point of intensified contact and aid in redirecting incoming dirt and debris particles out of the contact band of the contact surface and direct the incoming dirt and debris particles into the low pressure areas. Further, the protrusions are preferably identical to one another in size because they provide a continuous seal surface even in the absence of additional contact pressure.

In the preferred embodiment, at least a portion of the plurality of protrusions are oriented in a direction perpendicular to the contact surface, and preferably all the protrusions are oriented in a direction perpendicular to the contact surface.

INDUSTRIAL APPLICABILITY

It is not intended that the present invention be limited to the particular nature of the industrial application for the textured seals of the present invention. While textured seals are herein contemplated for circular and oscillatory motion, textured seals for linear motion are explicitly contemplated.

The present invention is also particularly useful for making radial seals such as rotating shaft seals and oscillating face seals for application in the automotive, construction equipment and earthmoving industry. The present invention is particularly useful for making axial face seals such as track bushing seals that undergo a slow oscillatory motion and which are subjected to a severe external environment of mud, dirt and debris. Such seals made according to the present invention exhibit vastly improved wear life and sealability. The present invention is also useful for making high speed rotating shaft seals such as those used in the automotive industry and in the home and commercial appliance industry. For example, this invention is particularly useful for making radial shaft seals for pumps, motors used in various commercial equipment and also in home appliances, such as dishwashers, for example.

Other aspects, objects and advantages of this invention can be obtained from a study of the disclosure, the drawing and the appended claims.

What is claimed is:

1. A seal assembly, comprising:
   a) a first surface, said first surface comprising an outer peripheral edge and textured features interior to said outer peripheral edge, wherein said textured features comprise protrusions extending outward from said first surface;
   b) a substantially flat second surface in motion relative to said first surface; and
   c) said first and second surfaces contacted under conditions such that a seal is produced.

2. The seal assembly of claim 1, wherein said protrusions have recesses.

3. The seal assembly of claim 1, wherein said protrusions have a cylindrical shape.

4. The seal assembly of claim 1, wherein said protrusions are identical.

5. The seal assembly of claim 1, wherein the spacing of each of said textured features are equidistant.

6. The seal assembly of claim 1, wherein the motion of said second surface is rotational.

7. The seal assembly of claim 1, wherein said outer peripheral edge is curved.

8. The seal assembly of claim 1, wherein said outer peripheral edge is raised.

9. A seal assembly, comprising:
   a) a substantially flat first surface;
   b) a second surface in motion relative to said first surface; wherein said second surface comprises an outer peripheral edge and textured features interior to said outer peripheral edge, wherein said textured features comprise protrusions extending outward from said second surface; and
   c) said first and second surfaces contacted under conditions such that a seal is produced.

10. The seal assembly of claim 9, wherein said protrusions have recesses.

11. The seal assembly of claim 9, wherein said protrusions have a cylindrical shape.

12. The seal assembly of claim 9, wherein said protrusions are identical.

13. The seal assembly of claim 9, wherein the spacing of each of said textured features are equidistant.

14. The seal assembly of claim 9, wherein the motion of said second surface is rotational.

15. The seal assembly of claim 9, wherein said outer peripheral edge is curved.

16. The seal assembly of claim 9, wherein said outer peripheral edge is raised.

17. A seal assembly, comprising:
   a) a first surface, said first surface comprising an outer peripheral edge and textured features interior to said outer peripheral edge, wherein said textured features comprise protrusions extending outward from said first surface wherein said protrusions have recesses;
   b) a substantially flat second surface in motion relative to said first surface; and
   c) said first and second surfaces contacted under conditions such that a seal is produced.

18. The seal assembly of claim 17, wherein said protrusions have a cylindrical shape.

19. The seal assembly of claim 17, wherein said protrusions are identical.

20. The seal assembly of claim 17, wherein the spacing of each of said textured features are equidistant.

21. The seal assembly of claim 17, wherein the motion of said second surface is rotational.

22. The seal assembly of claim 17, wherein said outer peripheral edge is curved.

23. The seal assembly of claim 17, wherein said outer peripheral edge is raised.

24. An assembly, comprising:
   a) a substantially flat first surface;
   b) a second surface in motion relative to said first surface; wherein said second surface comprises an outer peripheral edge and textured features interior to said outer peripheral edge, wherein said textured features comprise protrusions extending outward from said second surface wherein said protrusions have recesses; and
   c) said first and second surfaces contacted under conditions such that a seal is produced.

25. The seal assembly of claim 24, wherein said protrusions have a cylindrical shape.

26. The seal assembly of claim 24, wherein said protrusions are identical.

27. The seal assembly of claim 24, wherein the spacing of each of said textured features are equidistant.

28. The seal assembly of claim 24, wherein the motion of said second surface is rotational.

29. The seal assembly of claim 24, wherein said outer peripheral edge is curved.

30. The seal assembly of claim 24, wherein said outer peripheral edge is raised.

31. A method for creating a seal, comprising:
   a) providing:
      i) a first surface, said first surface comprising an outer peripheral edge and having textured features interior of said outer peripheral edge, wherein said textured features comprise protrusions extending outward from said first surface;
      ii) a substantially flat second surface in motion relative to said first surface; and
   b) compressing said first surface against said second surface under conditions such that a seal is produced.

32. The method of claim 31, wherein said protrusions have recesses.

33. The method of claim 31, wherein said protrusions have a cylindrical shape.

34. The method of claim 31, wherein said protrusions are identical.

35. The method of claim 31, wherein the spacing of each of said textured features are equidistant.

36. The method of claim 31, wherein said outer peripheral edge is curved.

37. The method of claim 31, wherein said outer peripheral edge is raised.

38. The method of claim 31, wherein the motion of said second surface is rotational.

39. A method for creating a seal, comprising:
   a) providing:
      i) a substantially flat first surface;
      ii) a second surface in motion relative to said first surface, wherein said first surface comprises an outer peripheral edge and having textured features interior of said outer peripheral edge, wherein said textured features comprise protrusions extending outward from said first surface; and
   b) compressing said first surface against said second surface under conditions such that a seal is produced.

40. The method of claim 39, wherein said protrusions have recesses.

41. The method of claim 39, wherein said protrusions have a cylindrical shape.

42. The method of claim 39, wherein said protrusions are identical.

43. The method of claim 39, wherein the spacing of each of said textured features are equidistant.

44. The method of claim 39, wherein said outer peripheral edge is curved.

45. The method of claim 39, wherein said outer peripheral edge is raised.

46. The method of claim 39, wherein the motion of said second surface is rotational.

* * * * *